(12) United States Patent
Hu et al.

(10) Patent No.: US 11,254,614 B2
(45) Date of Patent: Feb. 22, 2022

(54) LIGHTWEIGHT CONDUCTIVE MORTAR MATERIAL, PREPARATION METHOD THEREFOR AND METHOD OF USING THEREOF

(71) Applicant: SOUTH CHINA UNIVERSITY OF TECHNOLOGY, Guangdong (CN)

(72) Inventors: Jie Hu, Guangdong (CN); Wenhao Guo, Guangdong (CN); Qijun Yu, Guangdong (CN); Yangyang Zhu, Guangdong (CN); Jiyao Zhang, Guangdong (CN); Zhangmin Zhang, Guangdong (CN); Jiangxiong Wei, Guangdong (CN); Fangxian Li, Guangdong (CN); Yuwei Ma, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/644,508

(22) PCT Filed: Dec. 26, 2017

(86) PCT No.: PCT/CN2017/118425
§ 371 (c)(1),
(2) Date: Mar. 5, 2020

(87) PCT Pub. No.: WO2019/047426
PCT Pub. Date: Mar. 14, 2019

(65) Prior Publication Data
US 2020/0308053 A1    Oct. 1, 2020

(30) Foreign Application Priority Data

Sep. 11, 2017 (CN) .......................... 201710812074.9

(51) Int. Cl.
| | | |
|---|---|---|
| C04B 28/04 | (2006.01) | |
| C04B 14/02 | (2006.01) | |
| C04B 18/02 | (2006.01) | |
| C04B 22/06 | (2006.01) | |
| C04B 24/38 | (2006.01) | |
| E04B 1/64 | (2006.01) | |
| C04B 111/00 | (2006.01) | |
| C04B 111/40 | (2006.01) | |
| C04B 111/94 | (2006.01) | |

(52) U.S. Cl.
CPC ............ *C04B 28/04* (2013.01); *C04B 14/024* (2013.01); *C04B 18/027* (2013.01); *C04B 22/064* (2013.01); *C04B 24/38* (2013.01); *E04B 1/64* (2013.01); *C04B 2111/00172* (2013.01); *C04B 2111/00525* (2013.01); *C04B 2111/00577* (2013.01); *C04B 2111/40* (2013.01); *C04B 2111/94* (2013.01)

(58) Field of Classification Search
CPC ..... C04B 14/024; C04B 14/12; C04B 18/023; C04B 18/027; C04B 18/165; C04B 20/002; C04B 20/023; C04B 22/064; C04B 24/28; C04B 24/38; C04B 28/04; C04B 32/02; C04B 2111/00172; C04B 2111/00525; C04B 2111/00577; C04B 2111/26; C04B 2111/40; C04B 2111/94; E04B 1/64; Y02W 30/91
See application file for complete search history.

(56) References Cited

U.S. PATENT DOCUMENTS 4,722,861 A * 2/1988 Sawaide ................. C04B 20/10
427/215

FOREIGN PATENT DOCUMENTS

| CN | 1130604 | 9/1996 |
|---|---|---|
| CN | 103469212 | 12/2013 |
| CN | 105130302 | 12/2015 |

OTHER PUBLICATIONS

Machine Translation of Chinese Patent Specification No. CN 105130302 A . (Year: 2015).*
"International Search Report (Form PCT/ISA/210) of PCT/CN2017/118425", dated Jun. 6, 2018, with English translation thereof, pp. 1-4.

* cited by examiner

*Primary Examiner* — Anthony J Green
(74) *Attorney, Agent, or Firm* — JCIPRNET

(57) ABSTRACT

Disclosed are a lightweight conductive mortar material, a preparation method therefor and use thereof. The lightweight conductive mortar material includes the following components in parts by weight: 100 parts of cement, 25 parts to 60 parts of a conductive porous lightweight aggregate loaded with a modified agar gel, and 30 parts to 45 parts of water.

20 Claims, 5 Drawing Sheets

LIGHTWEIGHT CONDUCTIVE MORTAR MATERIAL, PREPARATION METHOD THEREFOR AND METHOD OF USING THEREOF

CROSS-REFERENCE TO RELATED APPLICATION

This application is a 371 of international application of PCT application serial no. PCT/CN2017/118425, filed on Dec. 26, 2017, which claims the priority benefit of China application no. 201710812074.9, filed on Sep. 11, 2017. The entirety of each of the above mentioned patent applications is hereby incorporated by reference herein and made a part of this specification.

TECHNICAL FIELD

The present invention relates to the field of reinforced concrete structure protection, and more particularly, to a lightweight conductive mortar material, a preparation method therefor and use thereof.

BACKGROUND

Reinforced concrete is widely used in the field of civil engineering due to excellent mechanical properties thereof. However, in coastal structures, deterioration of reinforced concrete structures caused by reinforcement corrosion will seriously affect structural safety thereof and shorten service life of the structures. The major inducement for the corrosion damage of the reinforced concrete is that the degradation of passive film that destroyed by the oxygen-contained corrosion reaction which occurred in chloride contaminated or carbonized environment.

For the corrosion prevention of the reinforced concrete structures, multiple corrosion protection techniques have been developed in the industry, including coating for reinforcement and concrete surface, cathodic protection, corrosion inhibitor, etc. Among these methods mentioned above, the cathodic protection has been identified by numerous authorities as the only effective corrosion control technology in the chloride contaminated environment. Cathodic protection is to combine an external anode and a power supply and reinforcements to form an electrical circuit system, so that the reinforcements are fully protected. In this technology, an inert metal strip or a wire mesh containing mixed metal oxides is typically adopted as a primary anode electrode in the external anode material, and mortar or conductive mortar is used to bury and fix the primary anode in the protected structure.

However, during the operation of the cathodic protection, the anode in the protection system will undergo anodic reactions dominated by $4OH^- \rightarrow O_2 + 2H_2O + 4e^-$ or $2H_2O \rightarrow O_2 + 4H^+ + 4e^-$ in polarizing state, causing acidification and dissolution of cement-based materials in the conductive mortar, increasing a contact resistance between the primary anode metal and the conductive cement mortar, causing corrosion damage to the primary anode metal and structural damage to the secondary anode mortar, and eventually reducing the protection efficiency of the system. The anodic acidification effect severely limits the application of the cathodic protection in the reinforced concrete structures.

At present, conductive anode mortar material is mostly prepared by mixing carbon fiber, graphite powder, metal or metal oxide (for sacrificial anode), coke breeze and etc. with cement paste. A resistivity of the prepared mortar ranges from 0.05 $\Omega \cdot m$ to 1.0 $\Omega \cdot m$. However, these conductive anode mortar materials have some limitations such as high cost and complicated preparation process. Moreover, although the conductive anode mortar can play a role of fixing and burying the anode metal electrode, it has no inhibiting effect on the acidification degradation that generated by the anodic acidification electrode reaction, and the added conductive enhancing components cannot provide supplementing alkaline electrolytes consumed by the anode reaction.

SUMMARY OF THE INVENTION

An objective of the present invention is to direct at the defects of the prior art and to provide a lightweight conductive mortar material. A conductive porous lightweight aggregate having a low resistivity and loaded with a functional modified agar is used as a raw material of the lightweight conductive mortar material to replace a traditional quartzose aggregate as a conductive enhancing phase of the mortar.

An objective of the present invention is also to provide a method for preparing the lightweight conductive mortar material.

An objective of the present invention is also to provide a method of using the lightweight conductive mortar material in cathode protection of a reinforced concrete structure. The lightweight conductive mortar material is used as a secondary anode material for fixing a primary anode metal and coated on a surface of the reinforced concrete structure, or is used for filling a concrete-gouged groove containing a primary anode metal electrode to serve as a composite anode with the primary anode metal to carry out cathodic protection on the reinforced concrete structure through an external current.

The objectives of the invention are achieved by the following technical solutions.

A lightweight conductive mortar material includes the following components in parts by weight: 100 parts of cement, 25 to 60 parts of a conductive porous lightweight aggregate loaded with a modified agar gel, and 30 to 45 parts of water.

Further, the cement is ordinary Portland cement or composite Portland cement with a strength grade of 42.5 (PII 42.5 R) or more.

Further, the conductive porous lightweight aggregate loaded with the modified agar gel is prepared through the following procedures:

(1) adding agar powder into water and heating until the agar powder is completely dissolved, adding inorganic electrolytes, keeping that a temperature of the solution is above 90° C. and continuously stirring the solution for more than 30 seconds, and supplementing boiling water with a corresponding mass lost by evaporation to prepare a modified agar aqueous solution; and then adding graphite powder into the modified agar aqueous solution, and forcibly stirring at a rotating speed of 60 r/min or more to evenly disperse the graphite powder into the modified agar aqueous solution; and (2) immersing porous ceramsites into the modified agar aqueous solution dispersed with the graphite powder, keeping the temperature above 80° C. and continuously stirring for more than 2 minutes, screening out the porous ceramsites, air cooling till the agar solution on the surface of ceramsites solidify into gel, and peeling off the excess agar gel to obtain the conductive porous lightweight aggregate loaded with the modified agar gel.

Still further, in the step (1), the inorganic electrolytes include sodium hydroxide, potassium hydroxide, and calcium hydroxide.

The inorganic electrolytes, such as sodium hydroxide, potassium hydroxide, and calcium hydroxide, are the main electrolytes in a cement-based composite paste material. By controlling an addition amount, ion exchange or balance between the modified agar material and the paste can be realized, and regulation and control of the paste and a hydration phase can be controlled and adjusted by adjusting a ratio of the modified agar material and an addition amount of the conductive porous lightweight aggregate.

Still further, in the step (1), in parts by weight, the lightweight conductive mortar material includes 100 parts of water, 4 to 10 parts of agar powder, 2 to 10 parts of graphite powder, 0.1 to 1.8 parts of sodium hydroxide, 1.0 to 2.8 parts of potassium hydroxide, and 1.0 to 8.9 parts of calcium hydroxide are included.

Still further, in the step (2), the porous ceramsites are clay porous ceramsites with an apparent density of no more than 1.19 g/cm$^3$, a water absorption rate of 6.48% or more, an average particle size of no less than 3.26 mm and a cylinder compressive strength of no less than 2.0 MPa.

The prepared conductive porous lightweight aggregate loaded with the modified agar gel is stored in a sealed manner before use.

Further, a particle size of the conductive porous lightweight aggregate loaded with the modified agar gel is between 3.5 mm and 4.0 mm.

Further, a resistivity $\rho(\Omega \cdot m)$ of the conductive porous lightweight aggregate in the conductive porous lightweight aggregate loaded with the modified agar gel is 0.5±0.2 $\Omega \cdot m$, and the resistivity $\rho(\Omega \cdot m)$ is quantitatively characterized and calculated by measuring an aggregate air content A (%) and using an equation: $\rho = \exp(1.36 \times 10^{-7} \times A^2 + 0.037 \times A - 3.29)$.

The conductive porous lightweight aggregate loaded with the modified agar gel is used as the conductive enhancing phase of the conductive mortar material, so that internal current distribution of the conductive mortar material is more uniform than that of fiber reinforcing components. Meanwhile, the overloaded electrolytes and alkaline ions in the modified agar gel in the conductive porous lightweight aggregate loaded with the modified agar gel are used to replenish hydroxide ions consumed in the primary anode metal electrode reaction, thereby inhibiting an acidification erosion effect of the anode reaction, improving a working efficiency of an anode system while prolonging a service life of the anode.

A method for preparing the lightweight conductive mortar material includes the following step:

in the above-described parts by weight, adding cement and water into a stirrer for pre-stirring, then adding a conductive porous lightweight aggregate loaded with modified agar gel for sufficient stirring and even mixing to obtain the lightweight conductive mortar material.

A method of using the lightweight conductive mortar material in cathodic protection of a reinforced concrete structure includes covering a surface of the reinforced concrete structure with the lightweight conductive mortar material, or using the lightweight conductive mortar material for filling a concrete-gouged groove containing a primary anode inert metal electrode.

Further, a construction method for said covering includes manual coating or mechanical spraying to form a 20 mm to 40 mm thick conductive mortar layer.

Compared with the prior art, the present invention has the following advantages and beneficial effects.

(1) The lightweight conductive mortar material according to the present invention can meet the basic mechanical performance requirements of plastering mortar, and has good compression resistance and bending resistance, and using the conductive porous lightweight aggregate loaded with the modified agar gel as the conductive enhancing phase is beneficial to reduce the bulk density of the mortar material.

(2) The lightweight conductive mortar material according to the present invention effectively reduces the resistivity of the conductive mortar material by adding the conductive porous lightweight aggregate loaded with the modified agar gel as the conductive enhancing phase, and meanwhile, the resistivity of the conductive mortar material changes along with the change of the age and the addition amount of the conductive porous lightweight aggregate loaded with the modified agar gel, and the change law of the resistivity varied with the ratio and the age accords with the electrical property law of general effective media model for composite conductive material with spherical filler.

(3) The lightweight conductive mortar material according to the present invention has high conductivity uniformity and can maintain high alkalinity inside the mortar, is able to effectively inhibit anodic acidification erosion caused by anodic acidification effects and partial cracking between the primary anode and the mortar during the operation of cathodic protection, and has an ability to stabilize in an alkali environment, improving the protection efficiency of the cathodic protection system while prolonging the anode service life.

(4) The lightweight conductive mortar material according to the present invention is simple to prepare, has raw materials that are relatively cheap, and is convenient to use.

DETAILED DESCRIPTION OF THE PREFERRED EMBODIMENT

The technical solutions of the present invention will be further described in detail below with reference to the specific embodiments and accompanying drawings, but the present invention is not limited thereto.

Different construction methods and application environments are satisfied by adjusting a ratio of a conductive mortar.

In the specific embodiments of the present invention, a conductive porous lightweight aggregate loaded with a modified agar gel is prepared by the following method:

(1) 6 g of agar powder was added into 100 mL of water and heated until the agar powder was completely dissolved. Inorganic electrolytes (0.33 g of sodium hydroxide, 1.40 g of potassium hydroxide, and 8.62 g of calcium hydroxide) were added. The solution was kept at a temperature of 100° C. and stirring was continued for 90 seconds at a rotating speed of 120 r/min. And, boiling water was added with a corresponding mass lost by evaporation after the solution was forcibly stirred, so as to keep a mass of components designed according to the ratio and obtain a modified agar aqueous solution. And then, 5.0 g of graphite powder was added into the modified agar aqueous solution, and was continuously stirred at a rotating speed of 60 r/min for 10 seconds to evenly disperse the graphite powder into the modified agar aqueous solution; and (2) porous ceramsites (with an apparent density of 0.73 g/cm$^3$, a water absorption rate of (1 h) 11.0%, an average particle size of less than 3.26 mm and a cylinder compressive strength of 2.2 MPa) was immersed into the modified agar aqueous solution dispersed with the graphite powder, the temperature was kept at 80° C. and stirring was continued for 2 minutes, the porous ceramsites were taken out, the agar on surfaces of the porous ceramsites was cooled by air to solidify into gel, and the excess agar gel was peeled off to obtain the conductive porous lightweight aggregate loaded with the modified agar gel with a particle size between 3.5 mm and 4.0 mm and a resistivity of 0.5 Ω·m.

Embodiment 1

A lightweight conductive mortar material includes the following components in parts by weight:

100 parts of cement (PII 42.5 R), 5, 10, 20, 30, 35, 40, 45 and 50 parts of a conductive porous lightweight aggregate loaded with a modified agar gel, and 35 parts of water.

A concrete pore solution was used to simulate a cathodic protection experiment of 5, 10, 20 and 40 parts of the conductive porous lightweight aggregates loaded with the modified agar gel. A concrete pore solution experiment is an experiment using a type and a concentration of solution ions in a concrete microscopic pore structure to replace a real cement-based composite paste material and test an inhibiting effect of the lightweight conductive mortar material on a mortar acidification effect, wherein results of the concrete pore solution experiment are highly correlated with an actual application process of the real cement-based composite material.

Figure 1:
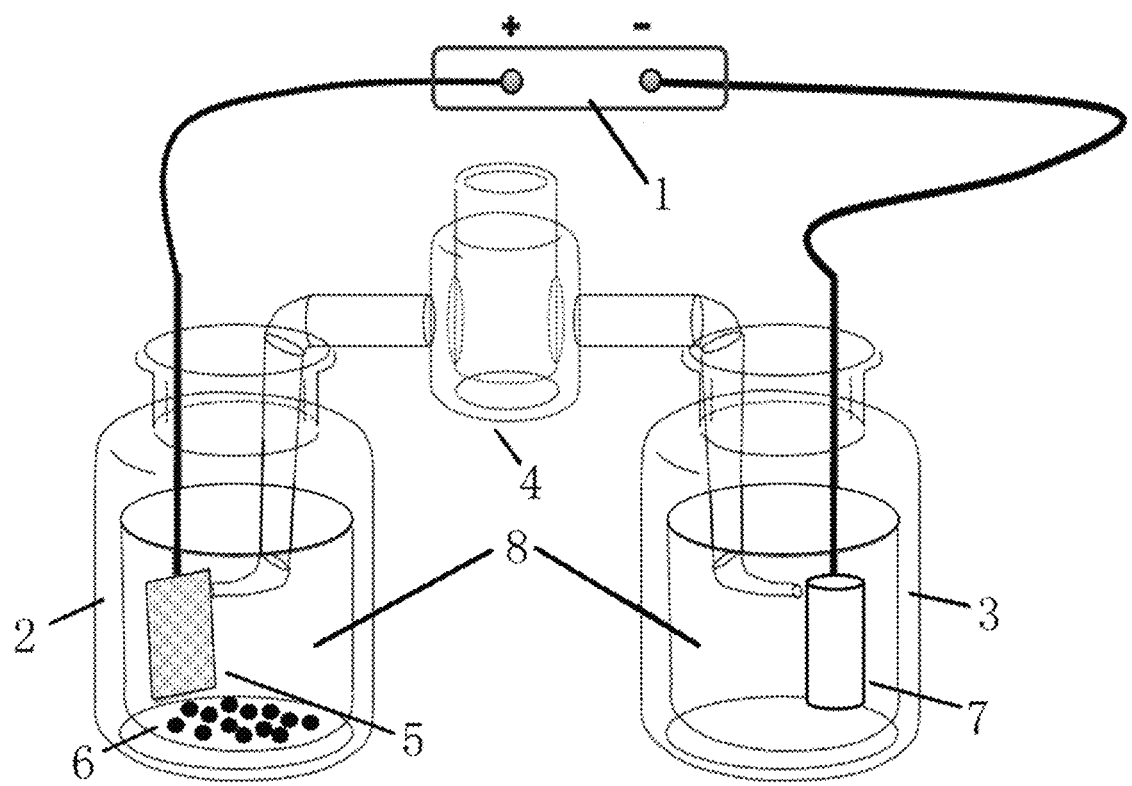
FIG. 1 is a schematic structure diagram illustrating a testing device using a concrete pore solution to simulate a cathodic protection experiment in Embodiment 1.

A schematic structure diagram of the adopted device is shown in FIG. 1, which includes a constant current meter 1, an anode pool 2, a cathode pool 3 and a salt bridge 4. A Ti-MMO metal primary anode 5 connected with an anode of the constant current meter 1 is arranged in the anode pool 2, and the conductive porous lightweight aggregate 6 loaded with the modified agar gel added according to said parts by weight is arranged in the anode pool 2. A reinforcement cathode 7 connected with a cathode of the constant current meter 1 is arranged in the cathode pool 3. Meanwhile, both the anode pool 2 and the cathode pool 3 are provided with a concrete pore solution 8 formed by mixing cement and water which are added according to said parts by weight.

Meanwhile, the same volume of reference anode mortar (the reference anode mortar uses ISO standard sand with the same volume as 40 parts of the conductive porous lightweight aggregate instead of the conductive porous lightweight aggregate) is used as a comparison.

Figure 2:
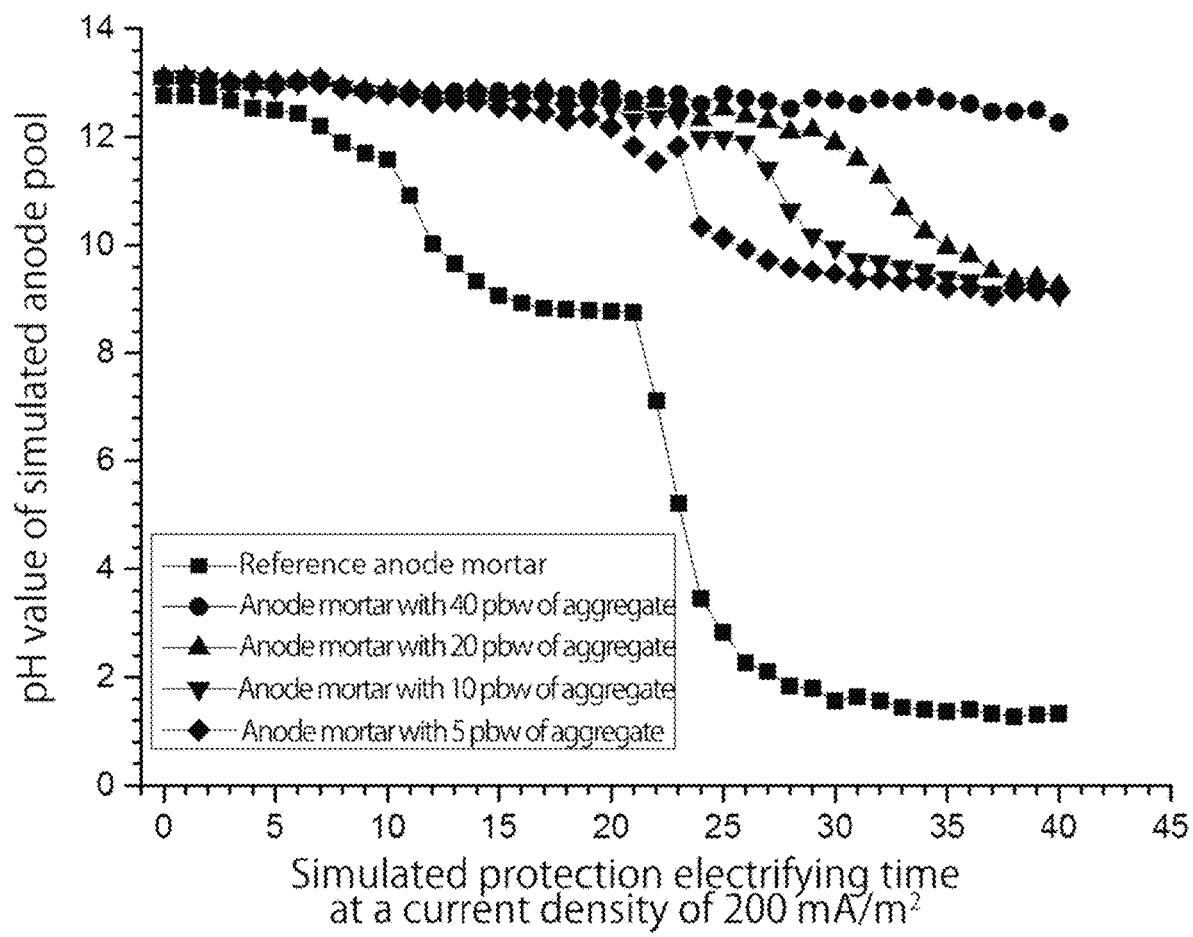
FIG. 2 is a diagram illustrating a testing result of the simulated cathodic protection experiment containing a conductive porous lightweight aggregate in Embodiment 1.

Experimental measurement results are shown in FIG. 2, wherein the experimental results show that under an accelerated erosion condition with a current density of 200 mA/m$^2$, a pH of the simulated pore solution of the anode pool containing the conductive porous lightweight aggregate loaded with the modified agar gel decreases more slowly than that of the simulated pore solution of the anode pool containing the reference anode mortar. Moreover, a reduction rate of the pH value of the simulated pore solution of the anode pool is inversely proportional to the added parts of the conductive porous lightweight aggregate: taking an electrifying age when the pH value of the pore solution drops to 9 for comparison, the anode pool of the reference anode mortar is 21 days, and the anode pools containing 5, 10 and 20 parts of the conductive porous lightweight aggregate all exceed 40 days, while the anode pool containing 40 parts of the conductive porous lightweight aggregate can still maintain an alkalinity of 12.6 under the same electrifying time.

Through the pore solution-simulated acidification experiment, it is shown that a mortar system containing the conductive porous lightweight aggregate has a function of inhibiting the anodic acidification effect through balance adjustment of the internal modified agar component under a working state of cathodic protection electrification, i.e., has an ability to stabilize in an alkali environment. Moreover, the ability to stabilize in the alkali environment of the lightweight conductive mortar material is proportional to parts by weight of the lightweight conductive mortar material in the mortar system. This is because that the maintenance effect mechanism of the stability in the alkali environment stability of the lightweight conductive mortar according to the present invention is that the modified agar gel material loaded in the conductive porous lightweight aggregate is communicated with the pore solution, and alkaline substances consumed by the anode electrode reaction are neutralized through migration of ions in the pore solution, so as to achieve the effects of maintaining normal alkalinity and ion concentration of the pore solution and delaying acidification dissolution. Therefore, the higher the parts by weight of the conductive porous lightweight aggregate in the mortar system are, the better the stability in the alkali environment of the mortar.

Preparation of the above-described lightweight conductive mortar material includes the following step:

in the above-described parts by weight, adding cement and water into a stirrer for pre-stirring, then adding a conductive porous lightweight aggregate loaded with modified agar gel for sufficient stirring and even mixing to obtain the lightweight conductive mortar material.

Figure 3:
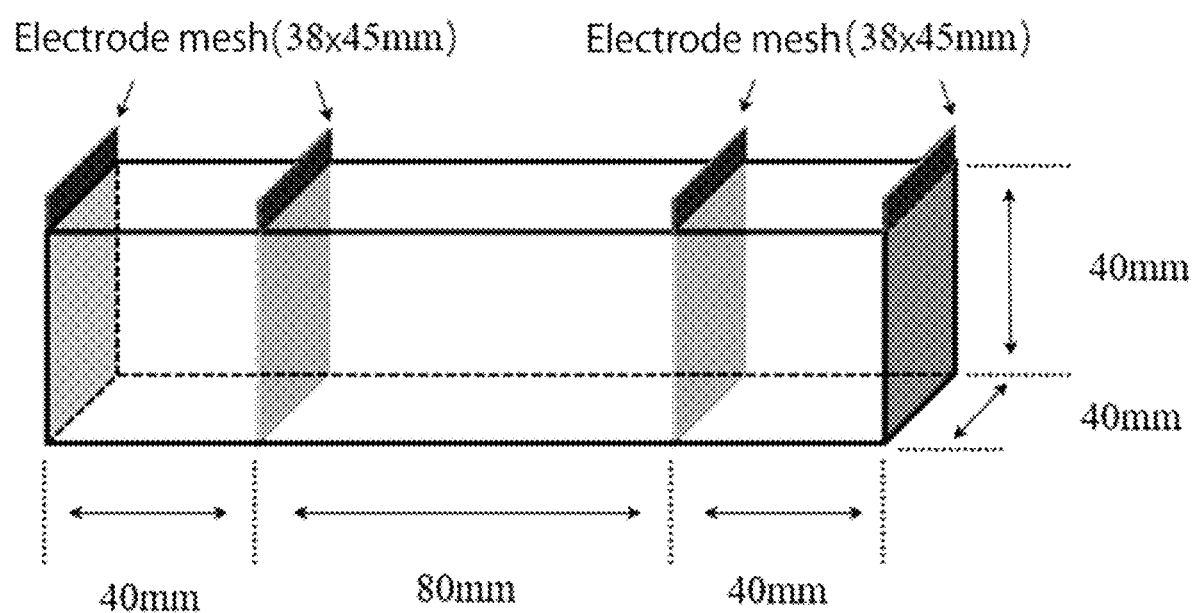
FIG. 3 is a diagram illustrating a size of a lightweight conductive mortar material molding sample inserted with an electrode slice in Embodiment 1.

The prepared lightweight conductive mortar material was stirred for 60 seconds by a standard mortar stirrer, and poured into a 40*40*160 mm standard mortar mold to form a film; then a Ti metal electrode slice with a mesh diameter of 2 mm was inserted according to a size spacing shown in FIG. 3 to prepare a sample for measuring the resistivity of the mortar.

Figure 4:
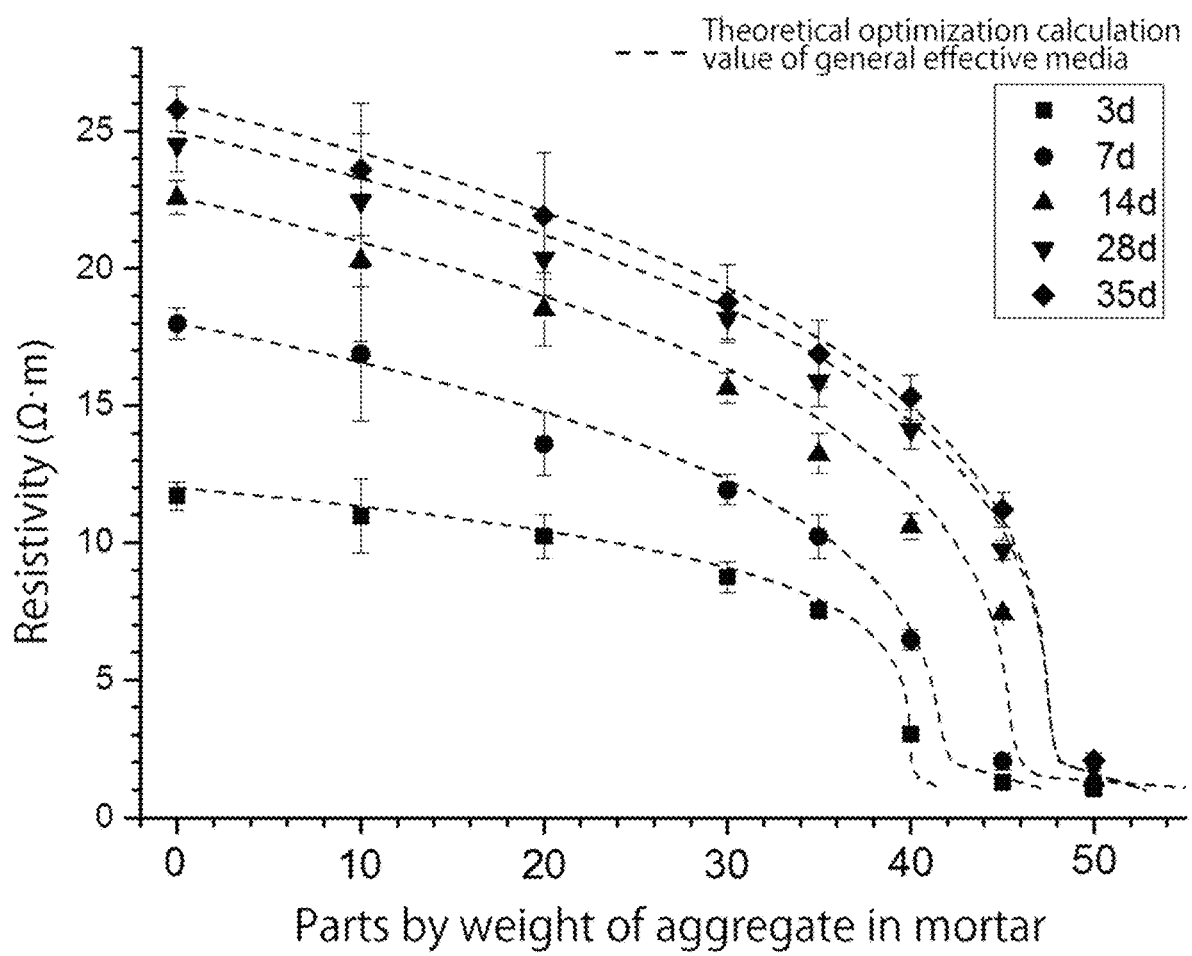
FIG. 4 is a diagram illustrating a relationship between a resistivity of each ratio and an age of the lightweight conductive mortar material in Embodiment 1.

The resistivities of different lightweight conductive mortar material are obtained by a direct current four-point method (ASTM G57-06(2012)) after curing at 20±2° C. and 95% relative humidity to a specific age. The measurement results of the resistivities of different lightweight conductive mortar materials at each age are shown in FIG. 4. It can be seen from FIG. 4 that the resistivity of the prepared lightweight conductive mortar material changes with the age and the addition amount of the conductive porous lightweight aggregate loaded with the modified agar gel. The resistivity of the lightweight conductive mortar material decreases with the increase of the parts of the conductive porous lightweight aggregate added. Moreover, the resistivity of the mortar is effectively decreased. Meanwhile, the change rule of the resistivity varied with the ratio and the age conforms to the electrical property law of General Effective Media for composite conductive material with spherical filler. Calculation results show that a conductive reinforcement phase (conductive porous lightweight aggregate) in the mortar at each ratio keeps at a level of 0.5 Ω·m at each monitoring age, and the resistivity of the conductive porous lightweight aggregate is not damaged along with hydration and compaction of the cement paste. A percolation threshold of the conductive porous lightweight aggregate in a cement-based composite is 45 parts by weight, which has a modification effect of significantly reducing the resistivity of the mortar, and an obvious percolation effect occurs when a content of the conductive porous lightweight aggregate loaded with the modified agar gel reaches an addition amount of 40 parts, and the resistivity of the mortar at an age of 28 days is lower than 2 Ω·m under an addition amount of 50 parts.

The lightweight conductive mortar materials prepared by 20, 30, 40 and 45 parts of the conductive porous lightweight aggregates loaded with the modified agar gel were made into 40 mm thick conductive mortar layers through manual coating. Under 28-day standard curing conditions (20±2° C., 95% relative humidity), the performances of each mortar ratio are shown in Table 1.

Table 1 Performance data of mortar under 28-day standard curing with different parts of conductive porous lightweight aggregate

TABLE 1

| Parts of lightweight aggregate | Breaking strength/MPa | Compression strength/MPa |
|---|---|---|
| 20 | 6.67 ± 0.28 | 25.32 ± 1.72 |
| 30 | 5.53 ± 0.36 | 21.01 ± 1.92 |
| 40 | 5.10 ± 0.29 | 19.80 ± 2.71 |
| 45 | 4.60 ± 0.26 | 16.61 ± 3.17 |

The lightweight conductive mortar materials prepared by 20, 30, 40 and 45 parts of the conductive porous lightweight aggregates loaded with the modified agar gel can meet the mechanical property requirements of basic plastering mortar. Moreover, it can be seen from Table 1 that the lightweight conductive mortar materials prepared by 20, 30, 40 and 45 parts of the conductive porous lightweight aggregates loaded with the modified agar gel have good compression resistance and breaking resistance.

Embodiment 2

A lightweight conductive mortar material includes the following components in parts by weight:

100 parts of cement (PII 42.5 R), 40 parts of a conductive porous lightweight aggregate loaded with a modified agar gel (equivalent to 35 vol. %), and 40 parts of water.

Preparation of the above-described lightweight conductive mortar material specifically includes the following step:

in the above-described parts by weight, adding cement and water into a stirrer for pre-stirring, then adding a conductive porous lightweight aggregate loaded with modified agar gel for sufficient stirring and even mixing to obtain the lightweight conductive mortar material.

The prepared lightweight conductive mortar material has good fluidity and can be filled in a 40*40*40 mm mold without vibration. An anode titanium mesh (primary anode metal) was inserted at a distance of 20 mm from a side surface in each mortar sample, and after standard curing for 7 days at 20±2° C. and 95% relative humidity, the primary anode was electrified with a current density of 66 mA/m² to accelerate an acidification corrosion process between a primary anode interface and a mortar interface.

Figure 5:
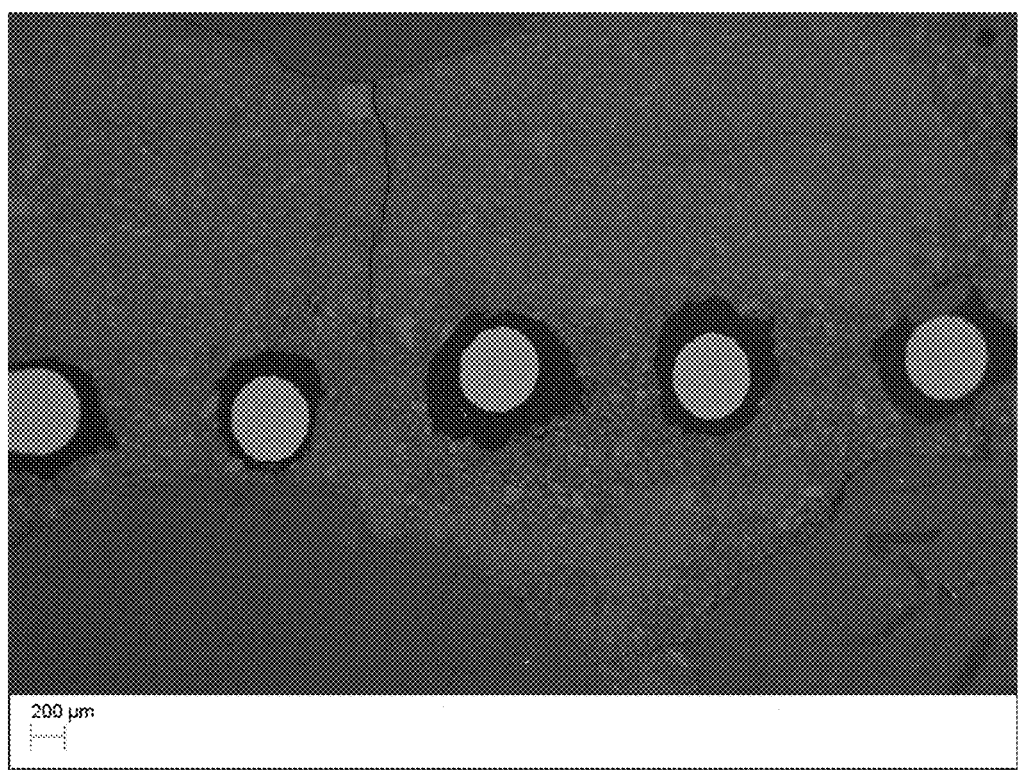
FIG. 5 is a scanning electron micrograph of a primary anode-mortar interface after a common aggregate mortar sample in Embodiment 2 is electrified.
Figure 6:
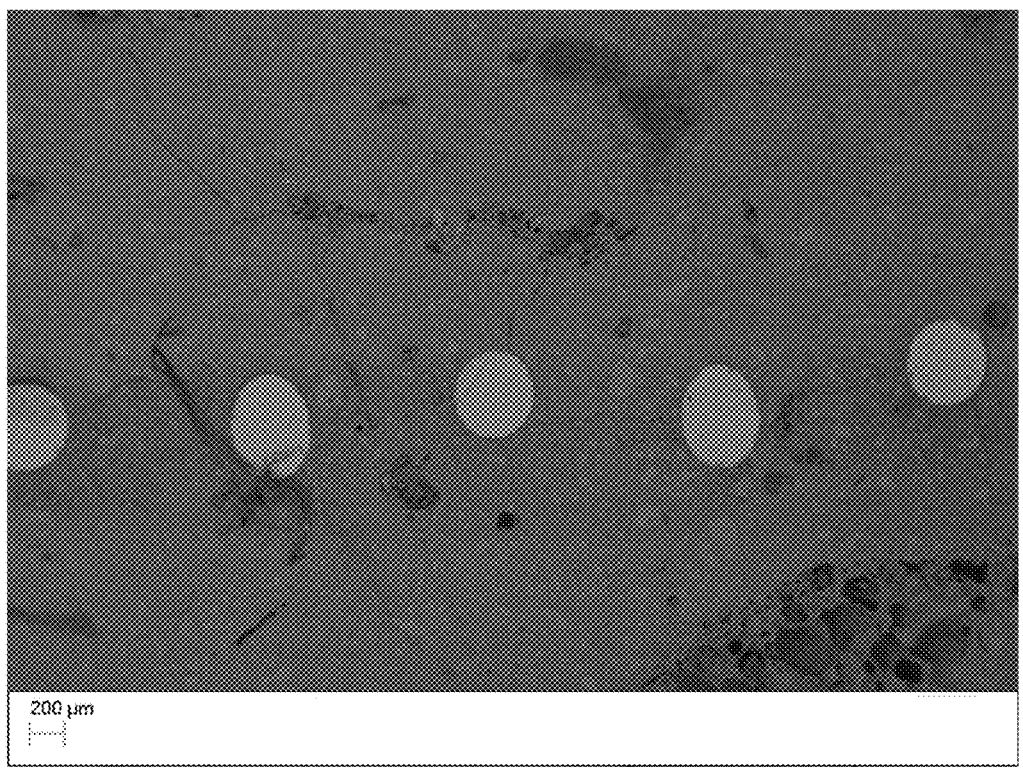
FIG. 6 is a scanning electron micrograph of a primary anode-mortar interface after a lightweight conductive mortar material in Embodiment 2 is electrified.

After the sample and the same volume of ordinary aggregate mortar (100 parts of cement PII 42.5 R and 100 parts of ISO standard sand) were electrified and acidified (electrified for 56 days), SEM backscatter mode observation samples were prepared after sampling the two samples. Scanning electron microscope observation results show that obvious dissolution phenomenon occurs near the primary anode interface in the mortar using the ordinary aggregate (as shown in FIG. 5), while obvious acidification corrosion is not seen in the anode metal interface of the mortar using the conductive porous lightweight aggregate under the same electrifying condition (as shown in FIG. 6), which indicates that the prepared lightweight conductive mortar material can inhibit the anodic acidification effect generated during cathodic protection electrification.

The above embodiments are only preferred embodiments of the invention, while the scope of protection of the present invention is not limited thereto. Any modifications, substitutions or improvements made by those skilled in the art without departing from the spirit of the present invention shall all fall within the scope of protection of the present invention.

What is claimed is:

1. A lightweight conductive mortar material, the lightweight conductive mortar material comprises the following components in parts by weight: 100 parts of cement, 25 to 60 parts of a conductive porous lightweight aggregate loaded with a modified agar gel, and 30 to 45 parts of water.

2. The lightweight conductive mortar material according to claim 1, wherein the cement is ordinary Portland cement or composite Portland cement with a strength grade of 42.5 or more.

3. The lightweight conductive mortar material according to claim 1, wherein the conductive porous lightweight aggregate loaded with the modified agar gel is prepared through the following method:

(1) adding agar powder into water and heating until the agar powder is completely dissolved, adding inorganic electrolytes, keeping that a temperature of a solution is above 90° C. and continuously stirring the solution for more than 30 seconds, and supplementing boiling water with a corresponding mass lost by evaporation to prepare a modified agar aqueous solution; and then adding graphite powder into the modified agar aqueous solution, and forcibly stirring at a rotating speed of 60 r/min or more to evenly disperse the graphite powder into the modified agar aqueous solution; and (2) immersing porous ceramsites into the modified agar aqueous solution dispersed with the graphite powder, keeping the temperature above 80° C. and continuously stirring for more than 2 minutes, taking out the porous ceramsites, cooling the agar on surfaces of the porous ceramsites by air to solidify into gel, and peeling off excess agar gel to obtain the conductive porous lightweight aggregate loaded with the modified agar gel.

4. The lightweight conductive mortar material according to claim 3, wherein in the step (1), the inorganic electrolytes comprise sodium hydroxide, potassium hydroxide and calcium hydroxide.

5. The lightweight conductive mortar material according to claim 4, wherein in the step (1), in parts by weight, the lightweight conductive mortar material comprises 100 parts of water, 4 to 10 parts of agar powder, 2 to 10 parts of graphite powder, 0.1 to 1.8 parts of sodium hydroxide, 1.0 to 2.8 parts of potassium hydroxide, and 1.0 to 8.9 parts of calcium hydroxide.

6. The lightweight conductive mortar material according to claim 3, wherein in the step (2), the porous ceramsites are clay porous ceramsites with an apparent density of no more than 1.19 g/cm$^3$, a water absorption rate of 6.48% or more, an average particle size of no less than 3.26 mm and a cylinder compressive strength of no less than 2.0 MPa.

7. The lightweight conductive mortar material according to claim 1, wherein a particle size of the conductive porous lightweight aggregate loaded with the modified agar gel is between 3.5 mm and 4.0 mm.

8. A method for preparing the lightweight conductive mortar material according to claim 1, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

9. A method of using the lightweight conductive mortar material according to claim 1 in cathodic protection of a reinforced concrete structure, the method comprises covering a surface of the reinforced concrete structure with the lightweight conductive mortar material, or using the lightweight conductive mortar material for filling a concrete-gouged groove containing a primary anode inert metal electrode.

10. The method according to claim 9, wherein a construction method for said covering comprises manual coating or mechanical spraying to form a 20 mm to 40 mm thick conductive mortar layer.

11. A method for preparing the lightweight conductive mortar material according to claim 2, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

12. A method for preparing the lightweight conductive mortar material according to claim 3, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

13. A method for preparing the lightweight conductive mortar material according to claim 4, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

14. A method for preparing the lightweight conductive mortar material according to claim 5, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

15. A method for preparing the lightweight conductive mortar material according to claim 6, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

16. A method for preparing the lightweight conductive mortar material according to claim 7, the method comprises the following step:
in said parts by weight, adding cement and water into a stirrer for pre-stirring, then adding a conductive porous lightweight aggregate loaded with modified agar gel for sufficient stirring and even mixing to obtain the lightweight conductive mortar material.

17. A method of using the lightweight conductive mortar material according to claim 2 in cathodic protection of a reinforced concrete structure, the method comprises covering a surface of the reinforced concrete structure with the lightweight conductive mortar material, or using the lightweight conductive mortar material for filling a concrete-gouged groove containing a primary anode inert metal electrode.

18. A method of using the lightweight conductive mortar material according to claim 3 in cathodic protection of a reinforced concrete structure, the method comprises covering a surface of the reinforced concrete structure with the lightweight conductive mortar material, or using the lightweight conductive mortar material for filling a concrete-gouged groove containing a primary anode inert metal electrode.

19. A method of using the lightweight conductive mortar material according to claim 4 in cathodic protection of a reinforced concrete structure, the method comprises covering a surface of the reinforced concrete structure with the lightweight conductive mortar material, or using the lightweight conductive mortar material for filling a concrete-gouged groove containing a primary anode inert metal electrode.

20. A method of using the lightweight conductive mortar material according to claim 5 in cathodic protection of a reinforced concrete structure, the method comprises covering a surface of the reinforced concrete structure with the lightweight conductive mortar material, or using the lightweight conductive mortar material for filling a concrete-gouged groove containing a primary anode inert metal electrode.

\* \* \* \* \*